United States Patent
Kwitek et al.

(10) Patent No.: US 12,417,438 B2
(45) Date of Patent: Sep. 16, 2025

(54) SYSTEM FOR WORKFORCE TALENT DISCOVERY, TRACKING AND DEVELOPMENT

(71) Applicants: Benjamin Kwitek, Canon City, CO (US); David Lewin, Beverly Hills, CA (US)

(72) Inventors: Benjamin Kwitek, Canon City, CO (US); David Lewin, Beverly Hills, CA (US)

( * ) Notice: Subject to any disclaimer, the term of this patent is extended or adjusted under 35 U.S.C. 154(b) by 322 days.

(21) Appl. No.: 16/948,172

(22) Filed: Sep. 6, 2020

(65) Prior Publication Data
US 2021/0073739 A1    Mar. 11, 2021

Related U.S. Application Data

(60) Provisional application No. 62/896,141, filed on Sep. 5, 2019.

(51) Int. Cl.
*G06Q 10/1053* (2023.01)
*G06Q 10/0631* (2023.01)
*G06Q 10/0639* (2023.01)

(52) U.S. Cl.
CPC . *G06Q 10/1053* (2013.01); *G06Q 10/063112* (2013.01); *G06Q 10/063114* (2013.01); *G06Q 10/06398* (2013.01)

(58) Field of Classification Search
CPC ....... G06Q 10/1053; G06Q 10/063112; G06Q 10/063114; G06Q 10/06398
See application file for complete search history.

(56) References Cited

U.S. PATENT DOCUMENTS

| | | | |
|---|---|---|---|
| 2002/0039352 A1* | 4/2002 | El-Fekih | H04L 47/822 370/252 |
| 2012/0005113 A1* | 1/2012 | Kotis | G06Q 10/1053 705/321 |
| 2014/0160222 A1* | 6/2014 | Agrawal | G06Q 10/1053 348/14.01 |
| 2015/0095077 A1* | 4/2015 | Ruffolo | G06Q 40/125 705/7.13 |
| 2017/0147984 A1* | 5/2017 | Zoia | G06F 16/9535 |
| 2018/0082256 A1* | 3/2018 | Tummuru | H04L 9/3236 |
| 2019/0114593 A1* | 4/2019 | Champaneria | G06F 16/3326 |
| 2019/0251573 A1* | 8/2019 | Toyota | H04L 9/3236 |
| 2020/0193356 A1* | 6/2020 | Moreno | G06Q 10/063112 |

* cited by examiner

*Primary Examiner* — Brendan S O'Shea
(74) *Attorney, Agent, or Firm* — Scott C Harris, Esq

(57) ABSTRACT

A method for workforce talent, tracking and development, that uses a computer for sending information to each of a plurality of applicants for a job. The computer gets information from people making recommendations about whether to hire the applicants. It sends information to the applicants indicating whether or not they have been selected for the job, including an accepted applicant for the job, and multiple other applicants who were not accepted for the job; and after a job has been accepted, using the computer for tracking multiple applicants including at least the accepted applicant for the job, and multiple of the other applicants.

6 Claims, 1 Drawing Sheet

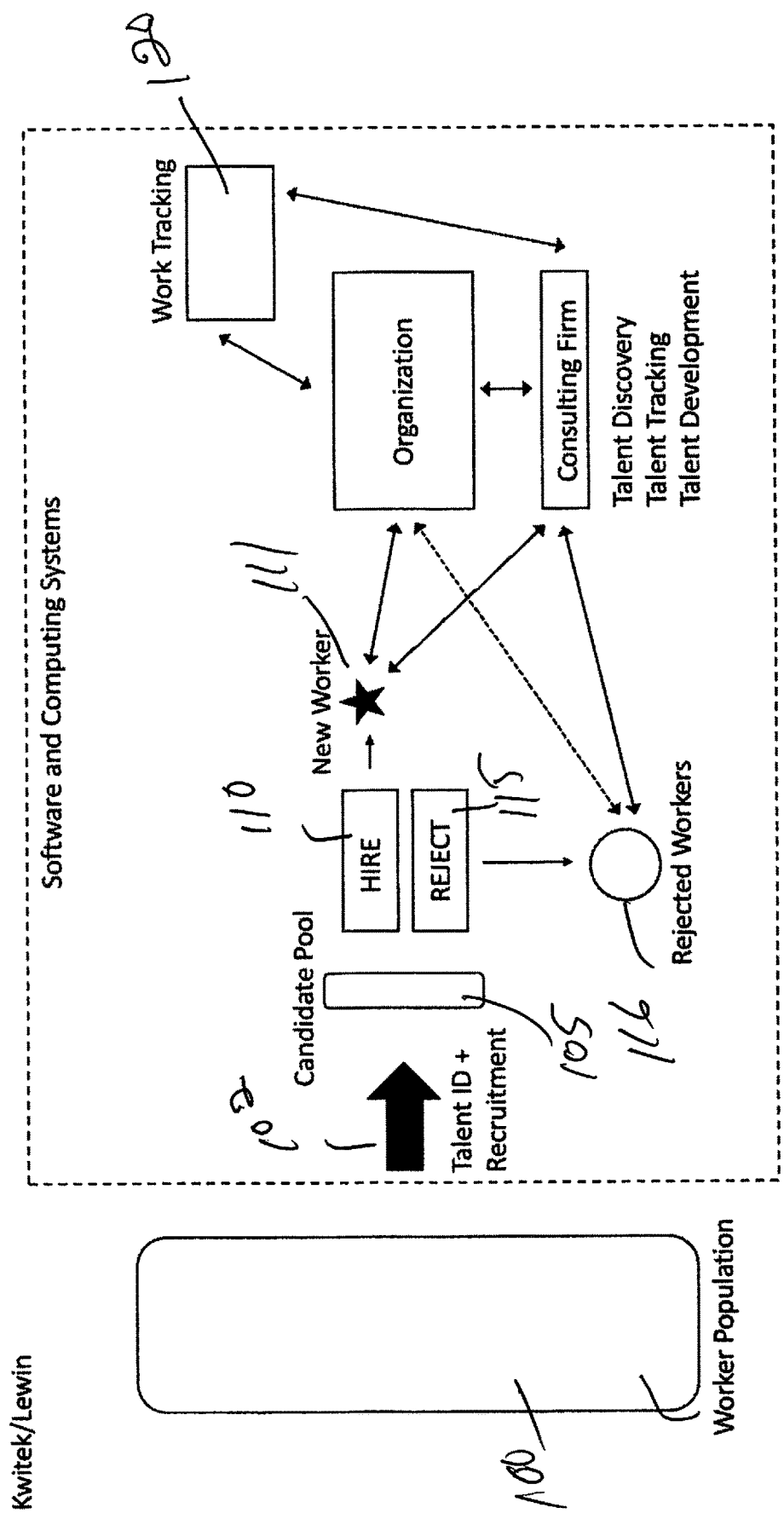

SYSTEM FOR WORKFORCE TALENT DISCOVERY, TRACKING AND DEVELOPMENT

This application claims priority from Provisional application No. 62/896,141, filed Sep. 5, 2019, the entire contents of which are herewith incorporated by reference.

BACKGROUND

Human Resources is the under-appreciated core of modern business. The employees of a company conduct their work and ultimately define the organization. Without employees, companies like Facebook and Google would just be countless lines of software code and empty cubicles. The human capital or talent of modern companies is the most essential element in driving market success and creating economic value. How to find, maintain, and maximize talent is the essential factor in the modern economy.

In previous decades and centuries, Human Resources (HR) was much easier. For example, 50 years ago, a company that experienced increased demand for its product, might make a managerial decision was made to hire more people. The HR department then drafted a simple job description and likely posted the announcement on the bulletin board and published it in local newspapers. Once applications were received, the HR personnel screened the applicants—weighing factors like education, training and experience. Perhaps the top applicants were then invited in for an interview. After the interview, a leading contender emerged. The HR personnel called or wrote a letter to check up on the candidate's references. Once this was complete, the job was offered to the applicant. The new employee then endured some training and/or orientation and then began his or her work. Other than annual performance appraisals or abnormal incidents, the HR department would likely fade away from the view of the new employee. The job of the HR department was generally complete once the new hire was onboard and working.

Up until recently, this system for hiring was commonplace around the world. Human Resources was a specialized role within the company. The HR department was somewhat isolated from the operations of the company. Their specialization made them focus on a single task.

Since the widespread use of the Internet began in the 1990's, this old-fashioned system for HR has made less sense each and every year. Despite this, many organizations still utilize processes and procedures in their HR departments that are grossly outdated and outmoded.

SUMMARY OF THE INVENTION

The inventors noted several key problems with the current systems.

First, there is often a disconnect between the functional organizational units within a company and the HR department. The HR department is not regularly included in decision-making and their functions only matter when they are perceived to really matter (in times of hiring, firing, discrimination, illegal activities or mergers and acquisitions). This lack of communication often creates ill-will and negative externalities with the organization. The divisions within a company view HR as a contractor that they call on when they need something. It is often very transactional and limited in scope.

Second job recruitment has not changed with modern technology. Although current job openings might be posted online now, instead of physical bulletin boards or newspapers, the content and process are largely the same. A net is cast in an effort to gather as many people as possible. This number of candidates is then filtered or narrowed for desired qualifications or characteristics. Perhaps a popular job posting attracts 500 applications. This 500 is likely reduced to something like 20 by the HR department. This might even occur with software that searches for various keywords. Ultimately, 480 out of 500 people are disregarded. Their physical or virtual applications are effectively shredded by the organization before they could even provide additional evidence or have an interview with the company. The remaining 20 candidates are then ranked and reviewed more carefully. Maybe the top five candidates are invited to an interview. It should be noted that the top 20 and eventually five, represent the top four and one percent the total applicant pool, respectfully in this example. This means their quality is already high when compared to the field. After an interview(s), the company eventually offers the position to one person. He or she now has the job. Unfortunately, the other 499 applicants and at least 19 quality candidates are released and perhaps even deleted from the organization's records. If these applicants are lucky, the company sends them an email saying "thanks but no thanks." Oftentimes, the dismissed applicants receive no feedback from the company. It appears that the popular mantra of, "no news is good news," does not apply to searching for work.

Repetitive processes dominate the world of HR. In the previous example, one person out of 500 was hired. The costs—in time and money—for this search are significant. It costs thousands or tens of thousands of dollars per new hire in recruitment and HR costs. This means billions of dollars per year for international corporations with hundreds of thousands of employees. Let's look at an example. XYZ Company (XYZ) is searching for a new Marketing Director for one of its divisions. It creates a job description. It then decides how to market the position. Perhaps its online job boards, hiring sites, word-of-mouth and an executive recruiter or "headhunter" could be chosen. All of these methods involve costs. The screening process to narrow the 500 to one also imposes costs such as HR personnel time, correspondence, legal compliance, travel and marketing. Perhaps this search costs $75,000. Once a person is hired, everyone believes the cost and investment was worth it. But, what if this new hire leaves XYZ for Google after three months? Alternatively, what happens if XYZ needs an Assistant Marketing Manager for this same division? The expensive process likely begins all over again. The previous search (although only months old) is outdated or has been purged by the company. The top 19 candidates are lost—at least as far as XYZ is concerned.

The inventors recognize that HR departments lose sight of new hires once they are onboarded. The HR department might manage their orientation or help them complete forms but their actual work within their departments is isolated from HR unless there is a problem. Unfortunately, this isolation means that HR does not know what the employee is doing on a daily basis. This becomes problematic when work tasks or job roles emerge or evolve. For example, an hourly employee at XYZ is now doing some management work without proper compensation or benefits. A manager is working overtime but is not being compensated because they are a manager. These challenges happen every day and they put the organization into increased risk and potential legal liability. Lawsuits and even class action lawsuits are being filed on these very issues. Are large corporations morphing jobs and job titles to minimize their expenses? If so, how does this impact their employees? What recourse do they have?

The inventors recognized that previous and unselected candidates are not monitored by most large organizations. Here is the analogy. Have you ever checked up on the status a previous girlfriend or boyfriend? Perhaps it is a simple Google search or a lookup on Facebook. This is somewhat natural (at least in moderation). It gives us a sense of "what could have been." Did my ex become a criminal, a lawyer or president? Did they marry someone better than me? The same process should occur with HR departments. In the previous example, 499/500 applicants are sent away. Why not track or keep in touch with some of them—particularly the best ones? These people and all of their assets are lost once the position is offered to someone else. It is a small world and with modern technology, this does not make good business sense.

The inventors also recognize that there are potential hiring errors. The first Type I Error—is a false positive. It involves hiring the wrong person for the job. The expectations for the employee were not matched with his or her performance. This means a lot of expenses related to additional management, training or the termination of this person. While this error is indeed costly, it is not as perilous to an organization as a Type II Error. Type II Errors are false negatives. They relate to not hiring someone and having them be successful elsewhere. The performance of the "lost" employee greatly exceeds the assessment of the company when he or she takes another position outside of the organization. Maybe the best analogy is sports. Think of the NFL Draft. What keeps managers and owners up at night? It might be the First-Round Pick that underperforms on the field but more likely, it is the Tom Brady that you passed over in the first few rounds of the Draft. He is now winning Super Bowls for another team because he was missed by many organizations. Type II Errors are worrisome to HR departments. The present invention helps limit these errors and increase the probability of getting and succeeding with the right talent.

While there are more problems than those that have been outlined here, they demonstrate how organizations across the planet need to update their systems, policies and best practices for their human resources. HR needs to enter the $21^{st}$ Century and utilize the processing, storage and transmission power of modern computing. Doing business like it was 1950 is a recipe for disaster in 2020. There have been some solutions and improvements, but they are not complete and do not address the broader economic issues involved with HR. The present offerings in the market, outlined below, do not adequately solve these problems.

One, there are recruiting companies such as Robert Half, Indeed and ZipRecruitor. While these companies provide technology to assist companies with their HR, they are only as effective as the companies that contract with them. Getting more applicants or having them organized on a dashboard helps make employment decisions but it does nothing to address functional problems within the organization, candidate tracking, repetitive searches, work reporting, candidate disengagement and non-existing talent development.

Two, there are software companies that automate HR processes. Companies like Salesforce or Oracle offer products to help link employees with common HR functions such as pay dates, healthcare and vacation time. The electronic management of these items is surely helpful but it is not "smart" in how it works. It is only as good as the formulas and worksheets that it displays and uses. This type of software does not link the actual work with the HR department. Furthermore, it does not address talent management.

Three, there are management consulting companies that specialize in HR. In particular, some offer programs to help increase talent utilization and deploy human capital more effectively. Again, their work and systems are only as effective as the structure of the underlying organization. They do not recreate the recruitment processes. They do not monitor the continuity between a job title and the actual work being performed across the organization. They cannot view the "ones who got away" and were never hired.

It is clear that the current market offerings do not fully address the issues being faced in the market. There is a need for more sophisticated methods and systems to surround talent management.

BRIEF DESCRIPTION OF THE DRAWINGS

The FIG. 1 shows a diagram of flow of the operation.

DETAILED DESCRIPTION

It is for this reason that we propose the following method and system.

A first aspect of the invention is candidate Tracking (before, during and after), using advanced candidate tracking mechanisms. This process begins when a candidate from the overall worker population 100 applies for a job. He or she would fill out a profile and questionnaire online. This electronic form would ask for relevant data and other information that might be useful to the employer. This electronic submission would include a Terms of Use Agreement that would specify the use and any privacy considerations for the candidate or client. It is also anticipated that Blockchain processes, ledgers and software be utilized. Blockchain could provide a detailed history for each employee that would be independently and securely verified by each node in the chain. This organization of employee data would be incredibly valuable to everyone—including the company, the candidate and future employers. The use of tokens and other rewards could be included to ensure accuracy and reporting. The data could also be protected and anonymized to prevent misuse.

1. Candidate Engagement (Social Network and Updates)

Once the online submission is verified, the candidate is assigned an internal talent ID at 102, and an external user name and password. This user name and password is used by the candidate to access his or her file and employment status. The user enters the candidate pool 105, which is accessed by software managing this interaction, which is accessible via computers and mobile devices. The storage and processing would likely occur at servers and other computers in alternate locations. It is, however, conceived that the user device may store some information and conduct some processing functions depending on the task. The software User Interface (UI) would be graphical and user-friendly. The opening screen after login might include a Dashboard with graphics and visual elements depicting the status of the relationship. In this way, the candidate would feel like he or she is involved in the process and not being ignored. It is anticipated that this service would also include additional resources such as Frequently-Asked-Questions (FAQs), links to employment resources, contact us pages and a network of people involved with the company. In this way, the software acts as a social network relating to the client and the industry.

2. Talent Retention and Development

The software would be accessed and updated by HR professionals within the client organization, related managers and by other external parties (such as recruiters) with the proper clearance and permission level. These individuals would also work with managers and people within the department the candidate is seeking to join. In this way, everyone would have access to the needed portions of the hiring process in real-time. The software would include links and integration to existing HR software resources so common things like performance appraisals and any disciplinary actions would be accessible to the proper personnel within the organization. It is useful to note that the proposed methods and systems would need to incorporate privacy considerations and policies. These could be incorporated into the software and registration processes.

3. HR and Department Communications Processes

The proposed software would also allow for efficient and effective communications between the candidate and the company. This might include auto-reply messages when information has been received. It would also allow for the candidate to learn more about the organization during the hiring process as well as later—even if the candidate is not hired. In this way, the candidate feels less rejected by the organization. It is almost analogous to the line in dating— "we can still be friends." This is also beneficial for the organization as it maintains a positive and proactive relationship with candidate for the next job opening.

Perhaps the best case study here is Southwest Airlines. Consistently regarded as one of the best places to work, Southwest Airlines always has more candidates than open positions. Even candidates who are not hired are treated with respect. Southwest gives them feedback and tries to maintain a positive rapport with them. In addition to keeping them friendly for potential future employment, this also helps their business as these people are more likely to fly Southwest Airlines even if they do not work for them. This would help minimize the chances of Type II Errors because it would allow for specialized recruitment and potential employee "poaching" practices.

The company could also automatically track the candidate and his or her successes. Perhaps these successes would trigger additional outreach and allow for that candidate to be a leading contender for other jobs within the organization. It would also address the problem of starting employment searches from scratch each time. The software and database would pre-populate screens and lists for the hiring managers based on this artificial intelligence or candidate tracking mechanisms.

4. Employee Work Tracking and Management

Each worker is either hired at 110 or rejected at 115. The hired workers 111 and the rejected workers 116 are both tracked, as described herein. The system would also allow for work tracking at 120 and management after an employee begins his or her job. Various factors could be tracked and recorded—including: number of hours, location, activity (physical, mental or machine), type of work, colleague interactions and other variables. This data would provide a snapshot into what actual "day-in-the-life" activities in that job look like. This can then be used to increase organizational efficiency and worker productivity.

In addition to the HR outcomes, there is a clear nexus to labor and employment matters within the organization. This data also serves as an accurate gauge of work to lessen the potential liability from employees claiming their work did not match their job description. This information would help employers modify incorrect workloads or prove correct workloads. It is anticipated that this data would be gathered through automatic and manual mechanisms and devices. These might include: data entry, motion and location tracking, video monitoring and output analysis from electronic devices. The company could establish thresholds (minimums) and limits (maximums) to ensure that every employee conducts the work they were hired to do. The present invention would include methods for time management techniques and procedures. With variations, the system could flag the HR Department so adjustments could be made before the problem becomes chronic or widespread within the organization.

5. Data Retention and Artificial Intelligence

The proposed invention envisions a series of unique methods and procedures that would facilitate better HR management and talent development. HR System recommendations for optimal candidate discovery, review and retention are essential. The collected data could then be analyzed with artificial intelligence and machine learning processes. Unique algorithms would be created to make sense of the data. Furthermore, it is anticipated that these processes could be used to generate notices, warnings and recommendations for the employee and his or her management. Much like modern automobiles alert the driver of conditions or maintenance issues, the proposed system would do this for HR data points on the individual and enterprise levels. Once again, it is worth noting that privacy concerns would need to addressed within this system. Like software in the social media space, it is anticipated that employees and users would be required to agree to Terms and Conditions relating to the data collection and retention, the programming and artificial intelligence capabilities of the computers.

6. Talent Development and Leadership Based on Best HR Practices

Modern employee performance is often difficult to measure. In a historical example, it was easy to count the number of tires places on automobiles rolling down an assembly line. Today, it is much more challenging to measure how much an employee sitting at his or her desk is accomplishing in a day. With smart sensors, cameras and other technologies, additional data on employees is captured. This data can then assist the HR Departments and the company management in its hiring, firing, development, promotion and wage decisions. The software and methods could also be adapted to test the theories of the company. Some employees could be given unique questionnaires or followed more closely to learn about how future employees might behave. Again, advanced storage and computational analysis will be key. Machine learning processes can help define software updates and inform HR professionals.

7. Talent Growth and Optimization

Talent growth and development is essential for modern organizations. Again, knowing how well an employee is actually performing is sometimes difficult. The proposed system would analyze these factors in the background. It could then provide automated messages and reminders to all of the stakeholders. The system could also call for occasional requests for the scans of current resumes and online profiles (such as LinkedIn). This data would then give the organization a sense of how each employee is growing or not. For example, if an organization wanted to improve foreign language skills in its workforce, it could offer training and then double-check the completion via the computer scans. In some ways, the proposed methods and systems pick up where current HR skills inventory techniques and practices end. Finally, these methods and systems for talent recognition and development might be linked to other content and expertise offered by another firm. This would help ensure the technology is making a difference within the organization.

Those skilled in the art will appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine.

The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard-wired network cable such as Ethernet or may be a wireless connection such as a RF link running under a wireless protocol such as 802.11. Likewise, external bus 18 may be any of but not limited to hard wired external busses such as IEEE-1394 or USB.

The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations, using tangible computer programming. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer-based instructions. An exemplary storage medium is coupled to the processor such that the processor can read information from, and write information to, the storage medium. In the alternative, the storage medium may be integral to the processor. The processor and the storage medium may reside in reconfigurable logic of any type.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

While the preferred embodiments have been shown and described, it will be understood that there is no intent to limit the invention by such disclosure, but rather, is intended to cover all modifications and alternate constructions falling within the spirit and scope of the invention.

SUMMARY

There is no question that HR is a field that needs more technology and advancement. This technology will assist the employer, the employee and other stakeholders. It is all about talent. How to find, keep and grow the right people makes all the difference in the world. Minimizing redundant and outdated work in recruitment and hiring will generate more revenue and lower costs for employers. The employee benefits because he or she is now seen as a person with talents—one with human capital that is changing and growing in his or her skill and experiences. Finally, others—including society in general—benefit because work can be done faster and more efficiently. The organization will also have more data and analysis on what their people actually do from a labor and employment perspective. This knowledge will reduce waste, encourage greater productivity and job satisfaction while potentially reducing liabilities and costs for the organization. Human Resource Management needs to utilize modern technology to be more effective.

What is claimed:

1. A method for workforce talent, tracking and development, comprising:

using a computer for sending information to each of a plurality of applicants for a job;

using the computer to accept information from people making recommendations about whether to hire the applicants;

sending information to the applicants indicating whether or not they have been selected for the job, including an accepted applicant for the job, and at least one other applicant who was not accepted for the job; and after a job has been accepted, using the computer for tracking multiple applicants including tracking at least the accepted applicant for the job and tracking the at least one other applicant by obtaining, at different times, current resumes and online profiles of the at least one other applicant, where at least one of the times is subsequent to another of the times, and where the using the computer provides information indicative of a difference in the current resumes and online profiles between the different times, and tracking at least a number of different factors for the multiple applicants that are recorded as data, the tracking including tracking the at least one of the other applicants who were not accepted for the job including scanning current resumes and online profiles of the at least one of the other applicants at the different times.

2. The method as in claim 1, wherein the tracking comprises tracking the accepted applicants job performance.

3. The method as in claim 2, wherein the job performance tracking includes number of hours worked, activities, type of work, and colleague interaction.

4. The method as in claim 2, wherein the tracking comprises sending communications to the other applicants and tracking the other applicants response.

5. The method as in claim 2, wherein the tracking of the at least one other applicants comprises monitoring online social networks to determine information about the other applicants.

6. The method as in claim 1, where the data is recorded using a blockchain process, a ledger and software to provide a detailed history for the multiple applicants that is independently and securely verified by each of a plurality of nodes.

* * * * *